Figure 1:
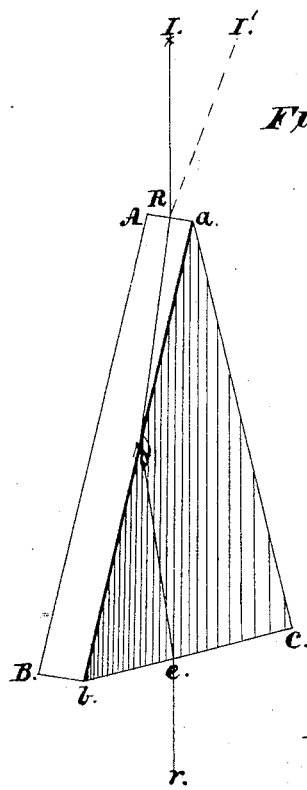
Figure 2:
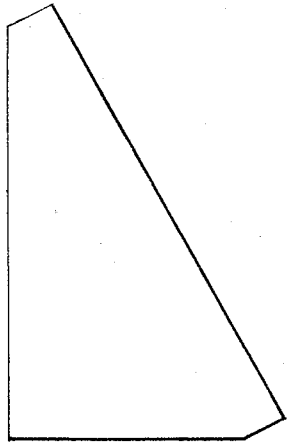
Figure 3:
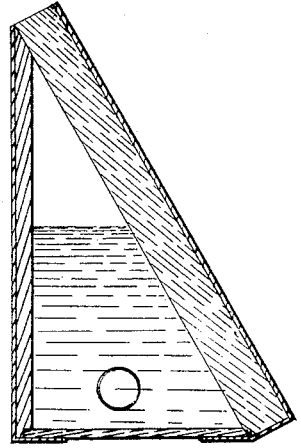

A. K. EATON.
Prism.

No. 160,756.  Patented March 16, 1875.

Witnesses:  
W. O. Osborn  
A. W. Osborn

Inventor:  
Asahel K. Eaton

UNITED STATES PATENT OFFICE.

ASAHEL K. EATON, OF BROOKLYN, NEW YORK.

IMPROVEMENT IN PRISMS.

Specification forming part of Letters Patent No. 160,756, dated March 16, 1875; application filed August 4, 1874.

*To all whom it may concern:*

Be it known that I, ASAHEL K. EATON, of Brooklyn, State of New York, have invented a Direct Prism, of which the following is a specification:

My invention consists in the construction of a prism, either hollow and filled with bisulphide of carbon or other dispersive fluid, or solid, of glass or other transparent substance, in such a manner that the incident ray and the mean ray of the emergent pencil shall be in the same right line—i. e., the action of the prism is direct, giving obvious advantages over the common form.

I will confine my description to the hollow bisulphide-of-carbon prism, since the same principle of construction applies to all.

It consists, as I usually construct it, of a prismatic frame-work, of iron, brass, or other material, having nearly the following angles: sixty degrees, thirty degrees, and ninety degrees. The angles, except that of sixty degrees, may be varied considerably. Upon the side $a\,b$ of the prismatic frame $a\,b\,c$ I cement a piece of thick crown-glass, the edge of which is represented by A B $a\,b$. The end of this plate $a$ A is cut and polished at right angles, or nearly so, to the side of the plate. Upon the end $b\,c$ of the prismatic frame I cement a piece of thin plate-glass. The other side of the prism (represented by $a\,c$) is of metal, and a part of the frame.

The prism thus constructed, having been filled with bisulphide of carbon or otherwise, is ready for use. The incident ray from the slit telescope of a spectroscope, or any other source, striking the polished end of the thick plate A B $a\,b$, is refracted to $d$, at which point, passing into the bisulphide of carbon, it is refracted again, reaching the end of the prism at $e$, where, as it passes into the air, it is again refracted, assuming a direction, $e\,r$, exactly coincident with the incident ray I K.

Dispersion, of course, accompanies these several refractions; but I have described the course of the mean ray only.

The surface A B of the plate is not used, and therefore is ground rough, or covered, so as to exclude light.

The prism may be used, obviously, with either end toward the source of light; but more than three times the dispersion is produced when the incident ray is received upon the broad end of the prism $b\,c$ than when used in the reverse position.

The advantages arising from this form of prism are as follows:

First, its direct action is a most obvious advantage in all its applications to spectroscopic or other investigations.

Second, when the incident ray is received upon the narrow end of the prism from the slit telescope of a spectroscope it gives fully the dispersion of an ordinary sixty degrees bisulphide-of-carbon prism, and even with a very wide slit gives great uniformity and sharpness of definition.

Third, if the incident ray strikes the end of the plate in the direction I' K the Fraunhofer lines are easily seen by the naked eye by means of the prism alone, no slit or collimator being used, the light being taken from a window or from some large aperture. The bright band of colored flames is also readily seen by the prism alone. In this case the prism does not act quite directly.

Fourth, by receiving the light from the slit telescope upon the broad end of the prism, the dispersion is so greatly increased that the solar lines $D^1$ and $D^2$ may be so widely separated that the nickel line is readily seen between them. This use of the prism requires careful adjustment.

The same general results, varying in degree, are obtained by the use of solid dispersive mediums, such as flint-glass, &c., the plate of crown-glass being cemented upon the side of the flint prism. The angles will, of course, vary with any considerable variation of the index of refraction.

I claim as my invention—

A prism having upon one of its sides a piece of crown-glass, having one or more polished ends, substantially as herein set forth.

ASAHEL K. EATON.

Witnesses:
W. E. OSBORN,
A. H. OSBORN.